United States Patent
Tanaka

(10) Patent No.: US 6,830,193 B2
(45) Date of Patent: Dec. 14, 2004

(54) NON-CONTACT IC CARD

(75) Inventor: Masahiko Tanaka, Fukuoka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 230 days.

(21) Appl. No.: 10/304,266

(22) Filed: Nov. 26, 2002

(65) Prior Publication Data

US 2003/0116634 A1 Jun. 26, 2003

(30) Foreign Application Priority Data

Nov. 29, 2001 (JP) .......................... 2001-364084
Nov. 29, 2001 (JP) .......................... 2001-364085

(51) Int. Cl.⁷ .......................... G06K 19/06; H01Q 7/00; H01Q 1/36
(52) U.S. Cl. .................. 235/492; 343/870; 343/895; 343/741; 343/804; 343/866; 343/867
(58) Field of Search ............... 343/870, 895, 343/728, 729, 751, 764, 769, 804, 893, 742, 799, 866, 767, 788, 741, 867; 235/492, 451

(56) References Cited

U.S. PATENT DOCUMENTS

| 5,198,647 | A | * | 3/1993 | Mizuta | 235/449 |
| 5,337,063 | A | * | 8/1994 | Takahira | 343/741 |
| 5,585,617 | A | * | 12/1996 | Ohbuchi et al. | 235/491 |
| 5,940,043 | A | * | 8/1999 | Canipe et al. | 343/742 |
| 6,343,744 | B1 | * | 2/2002 | Shibata et al. | 235/492 |
| 6,398,116 | B1 | * | 6/2002 | Kreft | 235/492 |
| 6,424,029 | B1 | * | 7/2002 | Giesler | 257/679 |

FOREIGN PATENT DOCUMENTS

| CA | 2319993 | 3/2001 |
| DE | 19645083 A1 | 5/1998 |
| EP | 1 087 332 A1 | 3/2001 |
| JP | 10-105660 | 4/1998 |
| JP | 10-312445 | 11/1998 |
| JP | 2000-172812 | 6/2000 |
| WO | WO 98/20450 | 5/1998 |
| WO | WO 01/43064 A1 | 6/2001 |
| WO | WO 01/84492 A1 | 11/2001 |

OTHER PUBLICATIONS

Supplemental International Search Report for Application No. PCT/JP02/12429 mailed Jun. 20, 2003.
Partial International Search Report for PCT/JP02/12429, dated Apr. 2, 2003.

* cited by examiner

Primary Examiner—Karl D. Frech
Assistant Examiner—Daniel Walsh
(74) Attorney, Agent, or Firm—RatnerPrestia

(57) ABSTRACT

A non-contact IC card includes an information storage unit for storing information, a communication controller for controlling communication with an external device, and a loop antenna for transmitting and receiving a radio wave to and from the external device. The non-contact IC card further includes a changeover switch for changing a communication distance between the external device and the card, so that the cost and size of the card can be reduced. The non-contact IC card can be used both in a long-distance mode and in a contact mode, which ensures high security.

14 Claims, 15 Drawing Sheets

FIG. 3A  for long-distance use
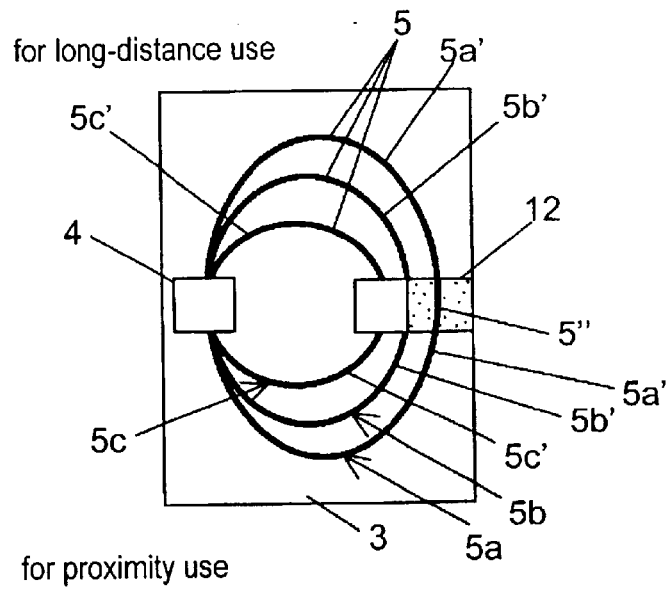
FIG. 3B  for proximity use
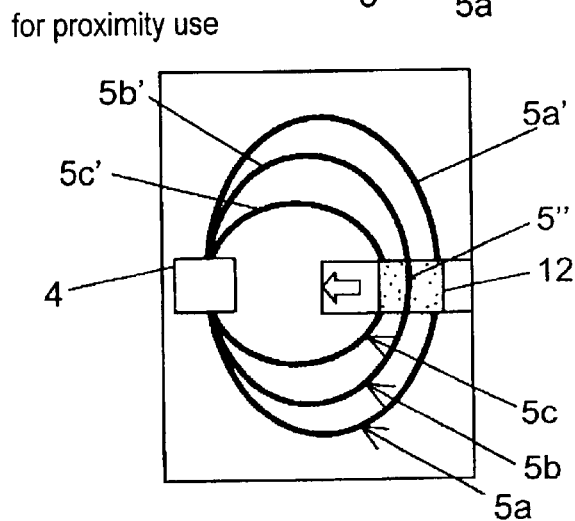
FIG. 3C  for contact use
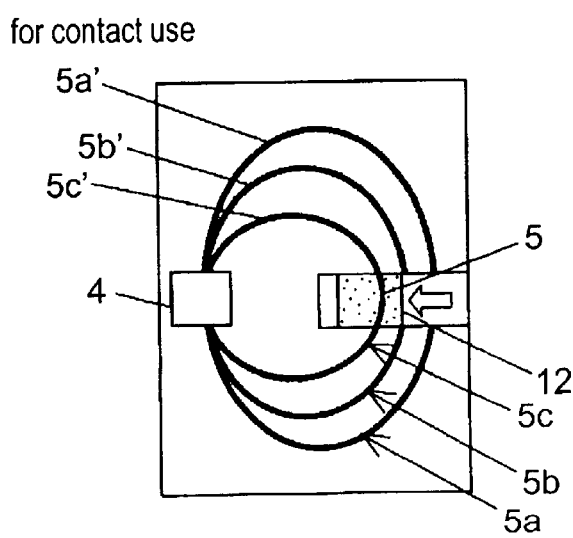

contact long-distance not used

FIG. 5A   two-stage switching
two turns
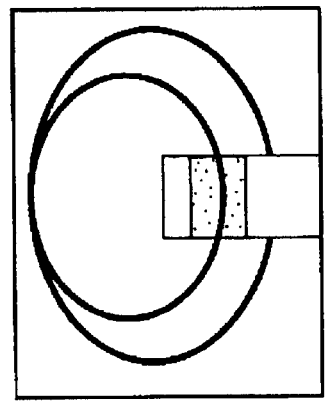
FIG. 5B   three-stage switching
three turns
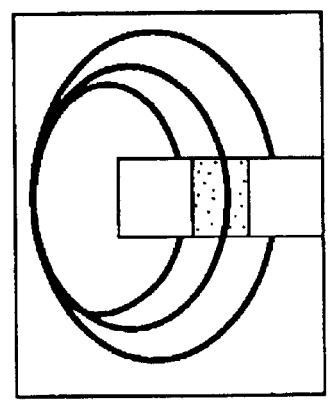
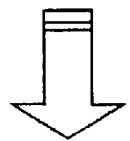
FIG. 5C   N-stage switching
N-turns
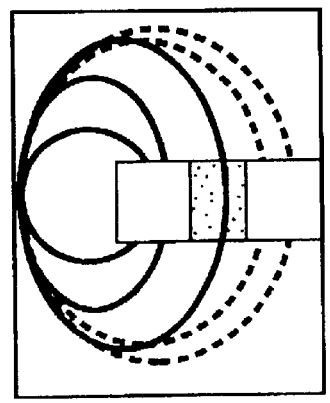

FIG. 6A  for contact use
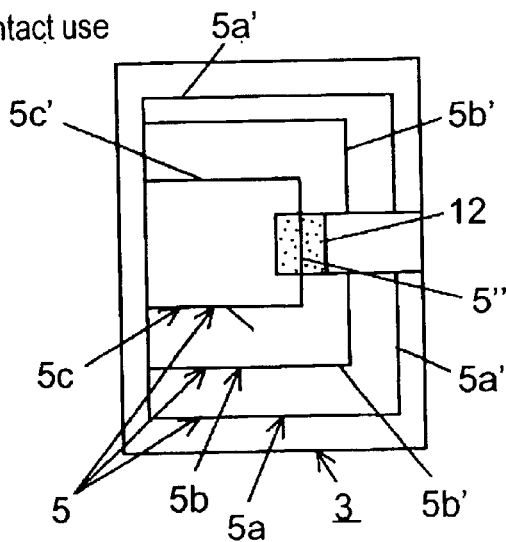
FIG. 6B  for proximity use
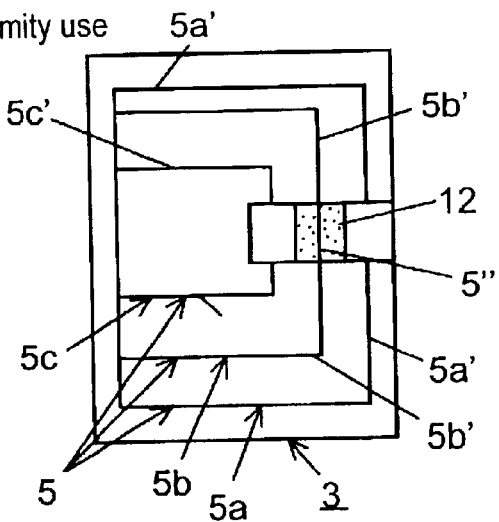
FIG. 6C  for long-distance use
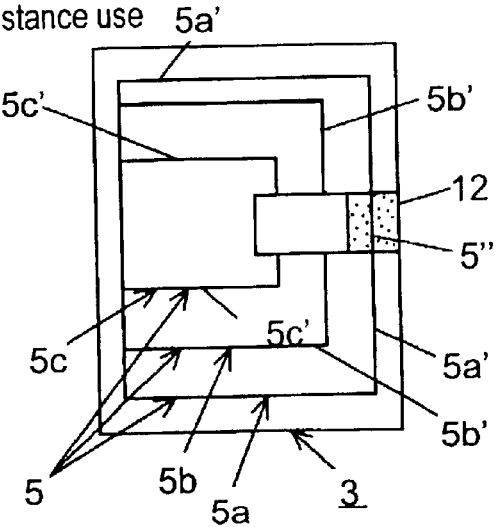

for proximity use for long-distance use when used (ON)

when not used (OFF)

when used (ON)

when not used (OFF)

NON-CONTACT IC CARD

FIELD OF THE INVENTION

The present invention relates to a non-contact IC card for use in a radio frequency Identification (RFID) system. More particularly, this invention relates to a non-contact IC card for use in a non-contact IC card system in which personal data is read in non-contact condition.

BACKGROUND OF THE INVENTION

A non-contact IC card disclosed in Japanese Unexamined Patent Publication No. 10-312445 (1998) is known as a conventional non-contact IC card.

FIG. 17 is a block diagram of the conventional non-contact IC card.

In FIG. 17, non-contact IC card 19 permits its stored information to be read in non-contact condition. Proximity type non-contact unit 20 is constructed of proximity type antenna 21 and proximity type communication controller 22. Proximity type antenna 21 transmits and receives a radio wave in communication with a nearby external device or in reception of electric power from the nearby external device. Proximity type communication controller 22 includes proximity modulator/demodulator 23 and proximity power supply 24. Proximity modulator/demodulator 23 has the function of controlling data communication with the nearby external device, and proximity power supply 24 has the function of converting the radio wave, which is incident on proximity type antenna 21 from the nearby external device, to the electric power.

Remote type non-contact unit 25 is constructed of remote type antenna 26 and remote type communication controller 27. Remote type antenna 26 transmits and receives a radio wave in communication with a remote external device or in reception of electric power from the remote external device. Remote type communication controller 27 includes remote modulator/demodulator 28 and remote power supply 29. Remote modulator/demodulator 28 has the function of controlling data communication with the remote external device, and remote power supply 29 has the function of converting the radio wave, which is incident on remote type antenna 26 from the remote external device, to the electric power.

Microprocessor (MPU) 30 includes information storage unit 31, which stores a program for processing information within non-contact IC card 19 in response to an external instruction, and information processing unit 32, which runs the program stored in information storage unit 31 in accordance with the external instruction to perform information processing such as operation on data.

Power storage unit 33 stores the electric power, which is transmitted from proximity and remote power supplies 24, 29, temporarily and supplies the electric power to effect the operation of information processing unit 32.

By having the structure described above, one non-contact IC card 19 is usable both in proximate and remote modes. Moreover, a program for automatically discriminating between the proximate mode and the remote mode based on the received radio wave is stored in information storage unit 31. When the radio wave is received, information processing unit 32 runs this program, so that internal processing in IC card 19 can be set automatically, the proximity type function can be performed in a field requiring high security, and the remote type function can be performed in a field requiring convenience.

Because above-described conventional non-contact IC card 19 includes the antenna and the communication controller for each of the proximate and remote modes, it is difficult to reduce the size and cost of IC card 19. Since it has been desired recently that a non-contact IC card be small, low-cost and usable both in a long-distance non-contact IC card system (e.g. an entry and exit system) and in a non-contact IC card system (e.g. a financial system) requiring high security, reduced size and reduced cost are demanded of the non-contact IC card.

Conventional non-contact IC card 19 is hard to use in the non-contact IC card system that requires contact use for high security because the setting of whether IC card 19 is used at great distance or in contact condition depends on the radio wave received from the external device.

Further, a non-contact IC card incorporating many services is on its way to becoming mainstream. Accordingly, it is desired that its IC chip be usable both in the long-distance non-contact IC card system and in the non-contact IC card system used for the service requiring high security and be low-cost and small.

The above-described conventional non-contact IC card, however, uses an IC chip, the size and cost of which are hard to reduce, because this conventional IC card requires antennas 21, 26 of proximity and remote types, communication controllers 22, 27 of proximity and remote types and others for use in the long-distance non-contact IC card system and in the non-contact IC card system requiring the contact use.

SUMMARY OF THE INVENTION

A non-contact IC card includes:
- an information storage unit for storing information;
- a communication controller for controlling communication with an external device;
- a loop antenna for transmitting and receiving a radio wave to and from the external device; and
- a changeover switch for changing a communication distance between the external device and the card.

BRIEF DESCRIPTION OF THE DRAWINGS

FIGS. 3A–3C are schematic plan views illustrating loop antennas and a changeover switch of the non-contact IC card in accordance with the first embodiment.

FIGS. 5A–5C illustrate the second embodiment using more than one loop antenna in the present invention.

FIGS. 6A–6C are schematic plan views illustrating loop antennas and a changeover switch of a non-contact IC card in accordance with a third exemplary embodiment.

DESCRIPTION OF THE PREFERRED EMBODIMENTS

Exemplary embodiments of the present invention are demonstrated hereinafter with reference to FIGS. 1–16.
(Exemplary Embodiment 1)

Figure 1:
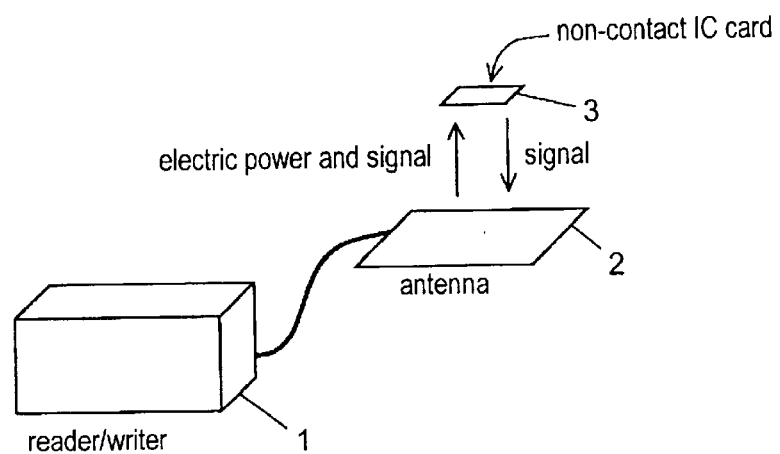
FIG. 1 is a block diagram of a non-contact IC card system in accordance with a first exemplary embodiment.

FIG. 1 is a block diagram of a non-contact IC card system in accordance with the first exemplary embodiment.

Antenna 2 transmits and receives a radio wave to and from non-contact IC card 3 under the control of reader/writer 1.

Figure 2:
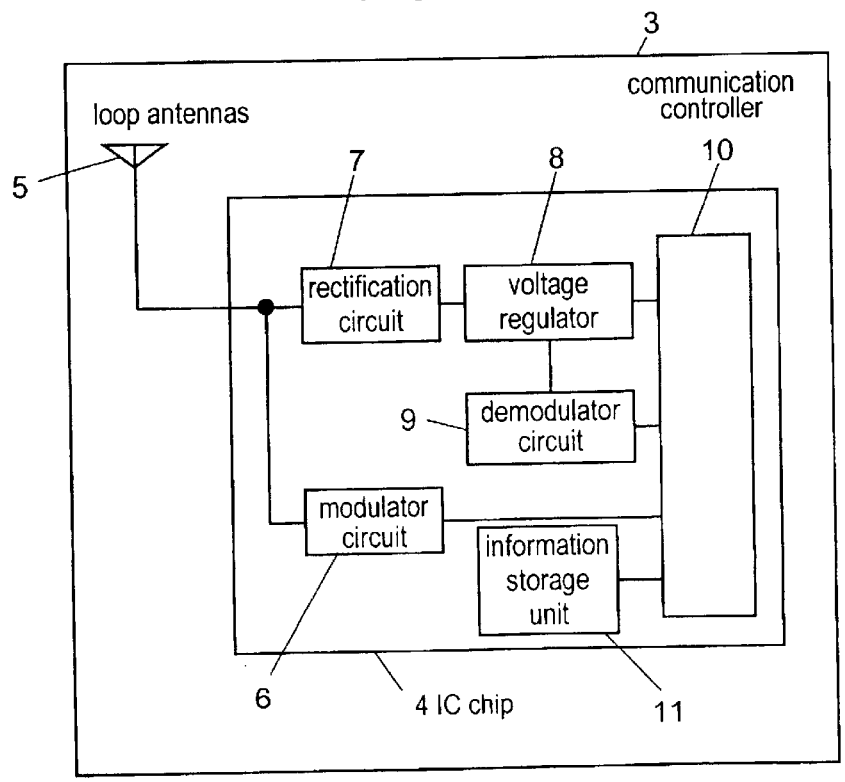
FIG. 2 is a block diagram of a non-contact IC card in accordance with the first embodiment.

FIG. 2 is a block diagram of the non-contact IC card in accordance with the first embodiment.

In FIG. 2, non-contact IC card 3 permits its stored information to be read in non-contact condition. IC chip 4 controls transmission and reception for IC card 3, and loop antenna 5 transmits and receives the radio wave in communication with an external device and in reception of electric power from the external device. IC chip 4 includes modulator circuit 6 for transmitting a modulating signal to loop antenna 5 in transmission of the information, rectification circuit 7, voltage regulator 8, demodulator circuit 9 for demodulating a signal received by loop antenna 5 in reception of information, communication controller 10 for controlling the transmission and reception of the information, and information storage unit 11 for storing the information.

In FIGS. 1 and 2, reader/writer 1 transmits the electric power and the signal simultaneously to non-contact IC card 3 via antenna 2, whereby IC card 3 having no battery is supplied with the electric power and signal. In this way, reader/writer 1 can read the information (e.g. ID) retained in information storage unit 11 of IC card 3 without permission from a holder of IC card 3.

FIGS. 3A–3C are schematic plan views illustrating loop antenna 5 and a changeover switch of non-contact IC card 3 of the present embodiment.

In FIGS. 3A–3C, non-contact IC card 3, IC chip 4 and loop antenna 5 are similar to those in FIG. 2, so that they have the same reference marks, and the descriptions of these elements are omitted.

In the present embodiment, loop antenna 5 is constructed of three loop antennas 5a, 5b, 5c formed of respective loop coils having different loop areas. The respective loop coils of loop antennas 5a, 5b, 5c include respective fixed conductors 5a', 5b', 5c' each fixed to a body of non-contact IC card 3 and shaped to have a gap at a loop part, and movable conductor 5" removable from the gap of each one of fixed conductors 5a', 5b', 5c'.

Movable conductor 5" of the present embodiment is shared among loop antennas 5a, 5b, 5c. Loop antennas 5a, 5b, 5c are each formed into a circular loop, an elliptical loop, a deformed circular loop or a deformed elliptical loop, and loop antenna 5a has the largest loop area, while loop antenna 5c has the smallest loop area. Loop antenna 5b is disposed in loop antenna 5a, and loop antenna 5c is disposed in loop antenna 5b. These loop antennas 5a, 5b, 5c are connected to one another at a feeding point, and IC chip 4 is disposed at this feeding point. The gaps of loop antennas 5a, 5b, 5c are positioned opposite to the feeding point and have the same width.

Changeover switch 12 selects an antenna for transmission and reception between communication controller 10 and the external device from among loop antennas 5a, 5b, 5c through switching. Movable conductor 5" moves with changeover switch 12 and can be inserted and removed in and from the gap of each of fixed conductors 5a', 5b', 5c' by switching changeover switch 12. This switch 12 selectively inserts movable conductor 5" in the gap of the fixed conductor of one of loop antennas 5a, 5b, 5c, thereby connecting movable conductor 5" to the selected fixed conductor.

As shown in FIGS. 3A–3C, non-contact IC card 3 includes three circular loop antennas 5a, 5b, 5c, so that movable conductor 5" can be inserted in the gap of the fixed conductor of one of loop antennas 5a, 5b, 5c by moving changeover switch 12. In the loop antenna having movable conductor 5" inserted, movable conductor 5" connects both ends of the fixed conductor of this loop antenna in the gap, whereby the loop coil of this antenna forms a perfect loop, enabling the transmission and reception of the radio wave. Here, the other loop coils do not form perfect loops because ends of each of their respective fixed conductors are not coupled to each other at the gap, and consequently, these loop coils do not allow the transmission and reception of the radio wave. In this way, a selection can be made from three types of loop antennas including loop antenna 5a for long-distance use, loop antenna 5b for proximity use and loop antenna 5c for contact use.

In other words, switching changeover switch 12 allows three-stage adjustment of antenna gain, and just switching changeover switch 12 affords formation of a non-contact IC card adapted to long-distance, proximity and contact uses. One non-contact IC card 3 is thus usable both in a non-contact IC card system for long-distance transmission and reception and in a non-contact IC card system requiring transmission and reception in contact condition for high security. For example, in cases where IC card 3 is used in the long-distance non-contact IC card system, movable conductor 5" is connected to fixed conductor 5a' of loop antenna 5a, which has the largest loop area, by means of changeover switch 12, as shown in FIG. 3A. In cases where IC card 3 is used in the non-contact IC card system requiring proximity use, movable conductor 5" is connected to fixed conductor 5b' of loop antenna 5b by means of switch 12, as shown in FIG. 3B. In cases where IC card 3 is used in the non-contact IC card system requiring contact use, movable conductor 5" is connected to fixed conductor 5c' of loop antenna 5c, which has the smallest loop area, by means of switch 12, as shown in FIG. 3C.

As described above, non-contact IC card 3 of the first embodiment allows a user of IC card 3 to select the shape of the loop antenna with ease according to the type (communication distance or the degree of security) of non-contact IC card system in response to a question sent from reader/writer 1, thereby securing the communication distance suitable for the non-contact IC card system. Thus, non-contact IC card 3 is usable both in the non-contact IC card system enabling long-distance communication and in the non-contact IC card system, such as a financial system, which normally requires contact use for high security. In other words, this non-contact IC card 3 has the function of protecting personal information as well as allowing the long-distance use.

For example, in cases where a commuter pass and a bank card are incorporated into the same non-contact IC card 3, a connection is made to loop antenna 5a adapted to long-distance use for the commuter pass which does not require high security but a long communication distance. For the bank card which doest not require the communication distance but high security, a connection is made to loop antenna 5c adapted to contact use, whereby the communication is limited to the contact mode only. This prevents another reader/writer 1 from stealing the personal data during the use of non-contact IC card 3 (during the exchange of the personal data) in a bank.

(Exemplary Embodiment 2)

Loop antenna 5 of the first exemplary embodiment is feasible when the number of loop antennas is not less than two, and more the number of loop antennas, the finer the adjustment of communication distance. Also, holding changeover switch 12 in a position not connecting with loop antenna 5 allows non-contact IC card 3 not to react completely because of absence of feeding from reader/writer 1.

Figure 4A:
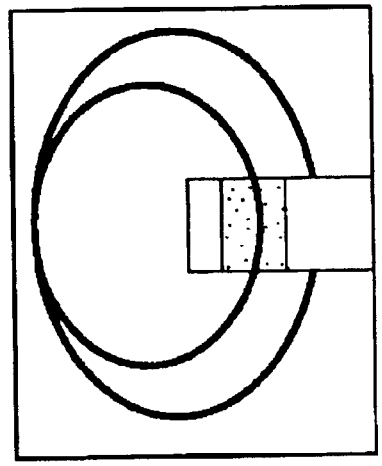
FIGS. 4A–4C illustrate a second exemplary embodiment using the minimum number of loop antennas that can carry out the present invention.
Figure 4B:
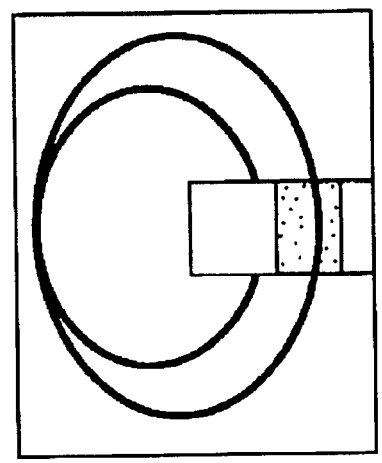
Figure 4C:
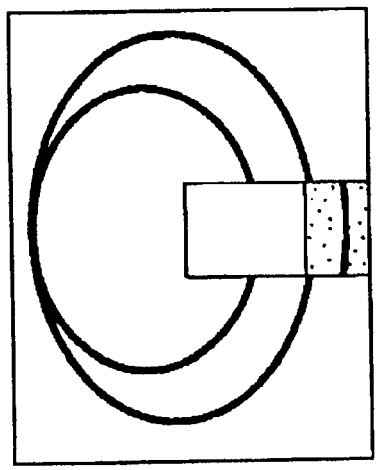

FIGS. 4A–4C illustrate the second exemplary embodiment using the minimum number of loop antennas that can carry out the present invention.

In FIG. 4C, a movable conductor which moves with the changeover switch is out of contact with fixed conductors, so that no loop antenna is formed. This brings the non-contact IC card to a state in which the card cannot communicate completely, and important data retained in the non-contact IC card can be completely protected when the IC card is not used.

FIGS. 5A–5C illustrate the second embodiment using more than one loop antenna in the present invention.

As shown in FIGS. 5A–5C, when the number of fixed conductors of different loop diameters is N turns (N≧2), N−1 switchings of the distance are possible in reception, and the more N is increased, the more the number of switchings of the distance in reception can be increased.

(Exemplary Embodiment 3)

Loop antenna 5 of the first exemplary embodiment has been circular. However, the present invention is feasible even with a loop antenna such as a square antenna.

FIGS. 6A–6C are schematic plan views illustrating loop antennas and a changeover switch of a non-contact IC card in accordance with the third exemplary embodiment.

In FIGS. 6A–6C, non-contact IC card 3, loop antennas 5, 6a, 5b, 5c, fixed conductors 5a', 5b', 5c', movable conductor 5" and changeover switch 12 are similar to those in FIG. 3, so that they have the same reference marks, and the descriptions of these elements are omitted.

In the present embodiment, square loop antennas 5a, 5b, 5c are held by non-contact IC card 3, demonstrating that not only the circular loop antenna but also the square loop antenna can switch the distance among contact, proximate and long-distance modes in transmission and reception.

(Exemplary Embodiment 4)

Figure 7A:
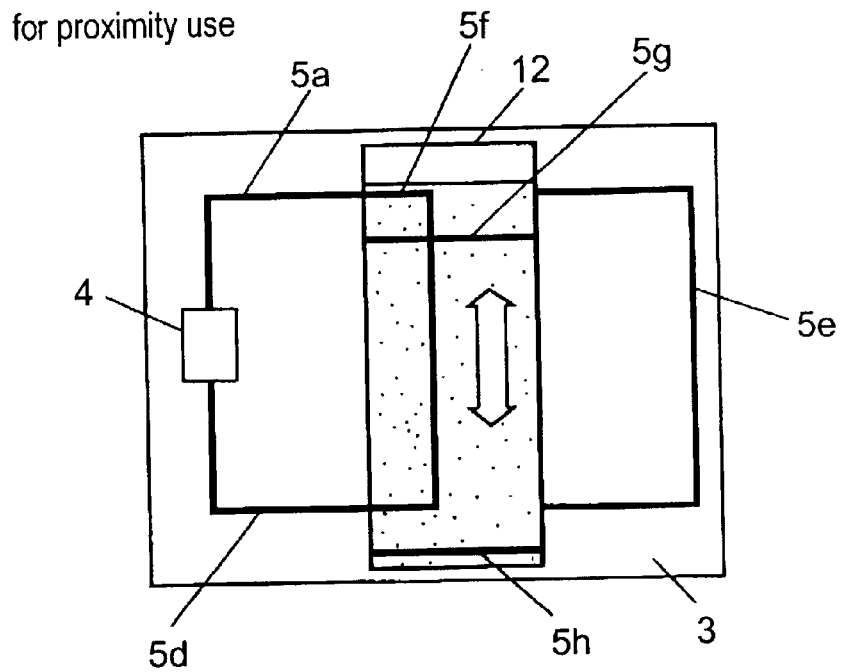
FIGS. 7A and 7B are schematic plan views illustrating loop antennas and a changeover switch of a non-contact IC card in accordance with a fourth exemplary embodiment.
Figure 7B:
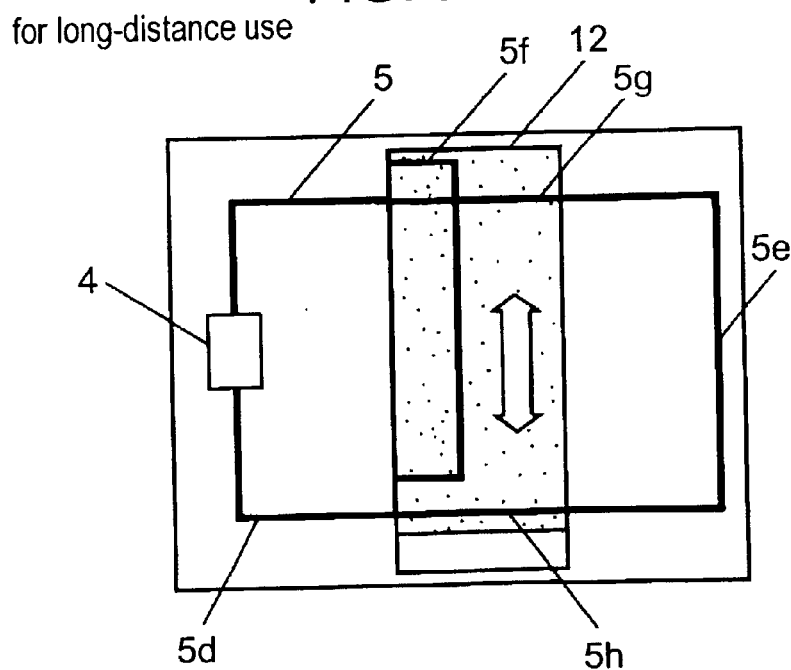

FIGS. 7A and 7B are schematic plan views illustrating loop antennas and a changeover switch of a non-contact IC card in accordance with the fourth exemplary embodiment. The non-contact IC card of the present embodiment is similar in structure to that illustrated by FIG. 2.

In FIGS. 7A and 7B, non-contact IC card 3, IC chip 4 and loop antenna 5 are similar to those in FIG. 2, so that they have the same reference marks, and the descriptions of these elements are omitted.

In this embodiment, loop antenna 5 is square and is constructed of inverted U-shaped fixed conductor 5d, U-shaped fixed conductor 5e disposed opposite to a side of fixed conductor 5d that has a gap, and movable conductors 5f, 5g, 5h slidable between fixed conductors 5d, 5e. Two parallel sides of fixed conductor 5d have the same spacing as two parallel sides of fixed conductor 5e, and fixed conductors 5d, 5e are disposed away from each other.

The two parallel sides of fixed conductor 5e are disposed on respective lines extending from the respective two parallel sides of fixed conductor 5d. Changeover switch 12 is formed of a slide switch disposed between fixed conductors 5d, 5e.

A feeding point of loop antenna 5 is disposed at a point of fixed conductor 5d, and IC chip 4 is disposed at this feeding point.

Movable conductor 5f is U-shaped, and two parallel sides of this movable conductor 5f have the same spacing as the two parallel sides of fixed conductor 5d and are shorter than the spacing between fixed conductors 5d, 5e.

Movable conductors 5g, 5h are straight and parallel to each other and have the same spacing as the two parallel sides of each of fixed conductors 5d, 5e. Also, these conductors 5g, 5h each have the same length as the spacing between fixed conductors 5d, 5e.

Movable conductors 5f, 5g, 5h move with changeover switch 12 in a linear direction perpendicular to the two parallel sides of each one of fixed conductors 5d, 5e. The two parallel sides of movable conductor 5f are out of alignment with movable conductors 5g, 5h, respectively. Movable conductor 5f connects with fixed conductor 5d at a point in its moving range, thereby forming one square loop in cooperation with fixed conductor 5d (see FIG. 7A).

Movable conductors 5g, 5h connect with both fixed conductors 5d, 5e at a point in their moving range, thereby forming one square loop in cooperation with fixed conductors 5d, 5e (see FIG. 7B). The square loop formed by fixed conductors 5d, 5e and movable conductors 5g, 5h has a larger loop area than the square loop formed by fixed conductor 5d and movable conductor 5f.

A description is provided hereinafter of an operation of the thus-configured non-contact IC card of the fourth embodiment.

Non-contact IC card 3 of the present embodiment too is used in the noncontact IC card system illustrated by FIG. 1. In FIG. 1, reader/writer 1 transmits electric power and a signal simultaneously to IC card 3 via antenna 2. IC card 3 having no battery receives the electric power and the signal by receiving a radio wave transmitted from reader/writer 1 by means of loop antenna 5, while permitting information (e.g. ID) retained in its information storage unit 11 to be read without permission from a holder of this IC card 3.

In communication with a nearby external device, movable conductor 5f is moved by means of changeover switch 12 for connection to fixed conductor 5d, as shown in FIG. 7A. Movable conductor 5f and fixed conductor 5d thus form a loop antenna, affording transmission and reception of the radio wave. Since this loop antenna formed is small in area, the radio wave can be transmitted and received only from a short distance and not from a great distance.

In communication with a remote external device, movable conductors 5g, 5h are moved by means of changeover switch 12 for connection to fixed conductors 5d, 5e, as shown in FIG. 7B. Movable conductors 5g, 5h and fixed conductors 5d, 5e thus form a loop antenna, affording transmission and reception of the radio wave. In this case, the loop antenna is large in area, so that the radio wave can be transmitted and received from a great distance.

As described above, changeover switch 12 changes loop antenna gain by changing the shape of the loop antenna, thereby switching communication distance between two modes. Thus, non-contact IC card 3 of the fourth embodiment can be used in a long-distance non-contact IC card system such as an entry and exit system and in a non-contact IC card system, such as a financial system, which requires communication over a short distance for high security. When used at a short distance, this IC card 3 does not permit readout from a great distance.

Figure 8:
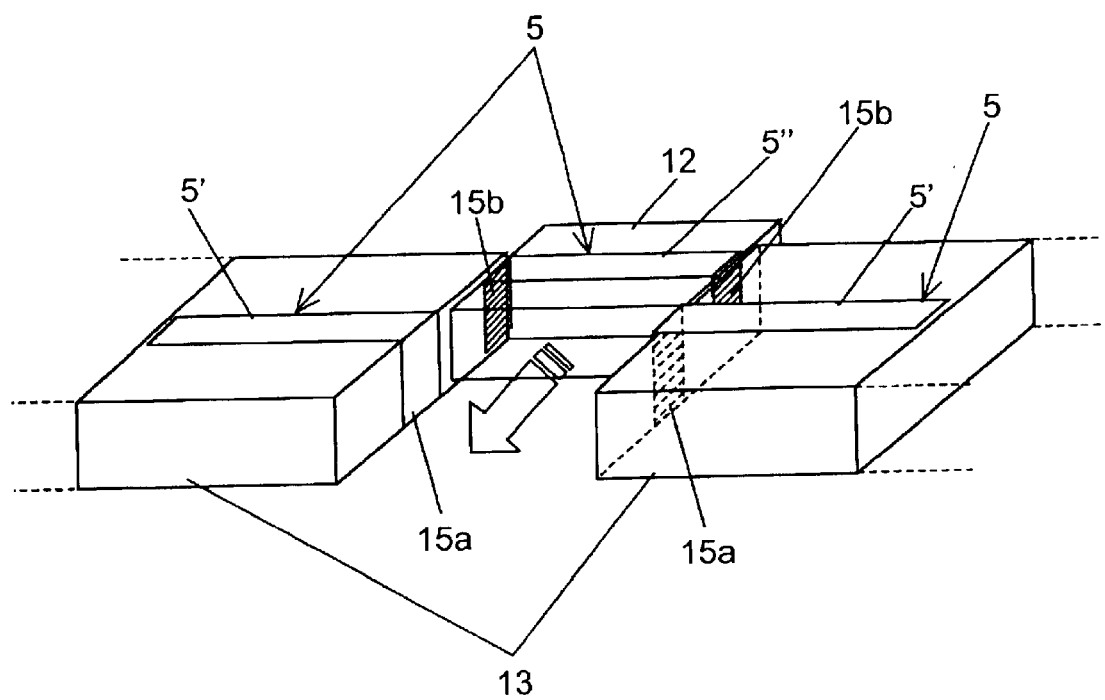
FIG. 8 illustrates a connecting method utilizing contact between a fixed conductor and a movable conductor in accordance with the fourth embodiment.

FIG. 8 illustrates a connecting method utilizing contact between the fixed conductor and the movable conductor.

In FIG. 8, fixed conductor 5' and movable conductor 5" of loop antenna 5 have metallic conductor terminals 15a, 15b at their respective contact parts. Fixed conductor 5' and movable conductor 5" are connected to each other by physical contact between conductor terminal 15a of fixed conductor 5' and conductor terminal 15b of movable conductor 5", thereby forming loop antenna 5.

Figure 9:
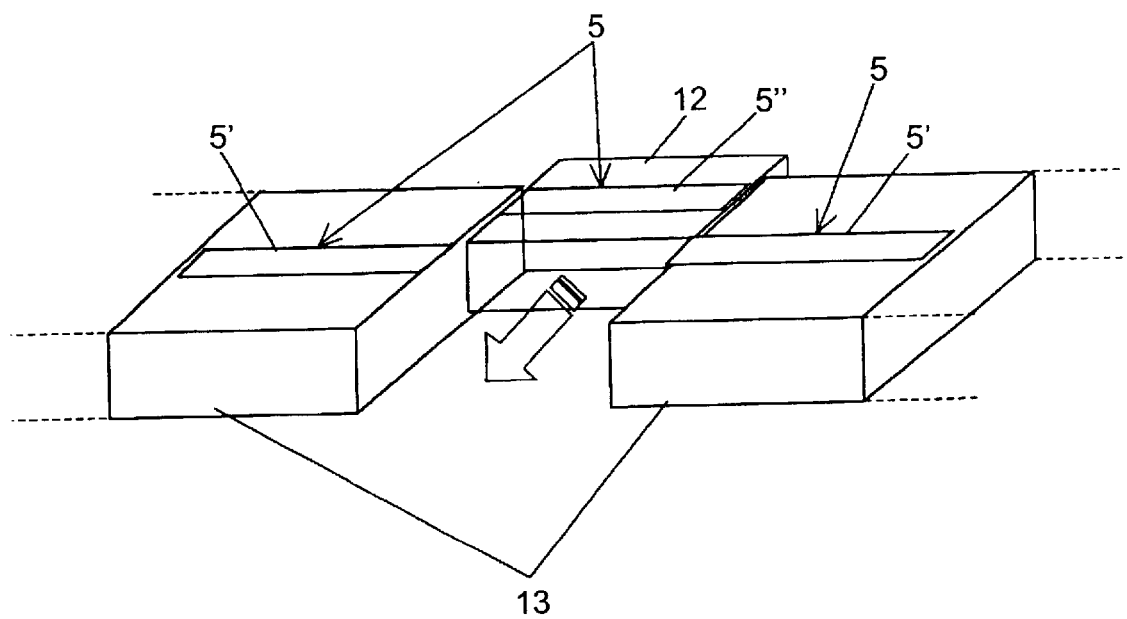
FIG. 9 illustrates a connecting method utilizing inductive coupling between the fixed conductor and the movable conductor in accordance with the fourth embodiment.

FIG. 9 illustrates a connecting method utilizing inductive coupling between the fixed conductor and the movable conductor.

In FIG. 9, fixed conductor 5' and movable conductor 5" of loop antenna 5 are coupled to each other at a high frequency by inductive coupling (electromagnetic coupling), thereby forming loop antenna 5.

(Exemplary Embodiment 5)

Figure 10A:
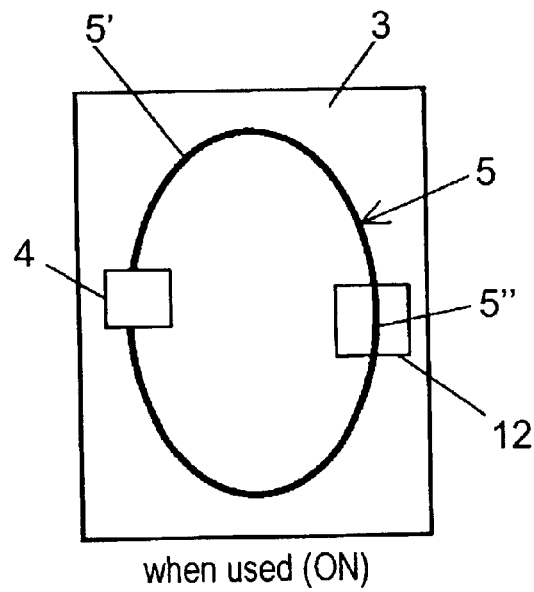
FIGS. 10A and 10B are schematic plan views illustrating a loop antenna and a changeover switch of a non-contact IC card in accordance with a fifth exemplary embodiment.
Figure 10B:
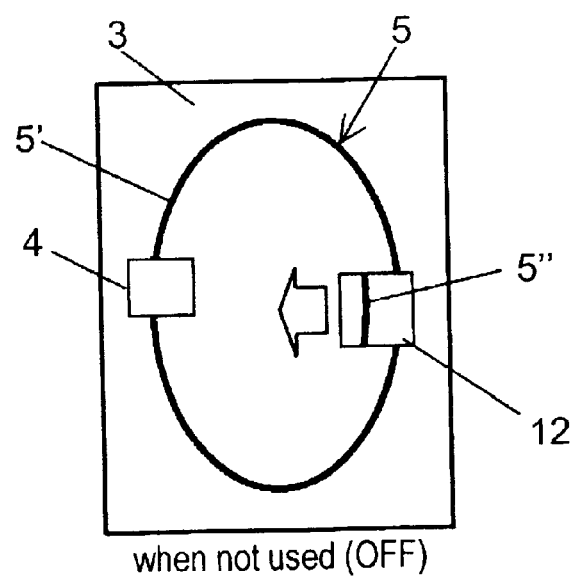

FIGS. 10A and 10B are schematic plan views illustrating a loop antenna and a changeover switch of a non-contact IC card in accordance with the fifth exemplary embodiment.

In FIGS. 10A and 10B, non-contact IC card 3, IC chip 4 and loop antenna 5 are similar to those in FIG. 2, so that they have the same reference marks, and the descriptions of these elements are omitted.

In the present embodiment, a loop coil of loop antenna 5 is constructed of fixed conductor 5', which is fixed to a body of non-contact IC card 3 and shaped to have a gap at a loop part, and movable conductor 5" removable from the gap of fixed conductor 5'. Loop antenna 5 is formed into a circular loop, an elliptical loop, a deformed circular loop or a deformed elliptical loop. IC chip 4 is disposed at a feeding point of loop antenna 5, and the gap of antenna 5 is positioned opposite to the feeding point.

Changeover switch 12 switches loop antenna 5 between a state in which transmission and reception are possible and a state in which the transmission and reception are impossible. In this embodiment, a slide switch is employed as changeover switch 12. Movable conductor 5" moves with changeover switch 12 and can be inserted and removed in and from the gap of fixed conductor 5' by switching changeover switch 12. This switch 12 inserts movable conductor 5" in the gap of fixed conductor 5' of loop antenna 5, thereby connecting movable conductor 5" to fixed conductor 5'.

Figure 12:
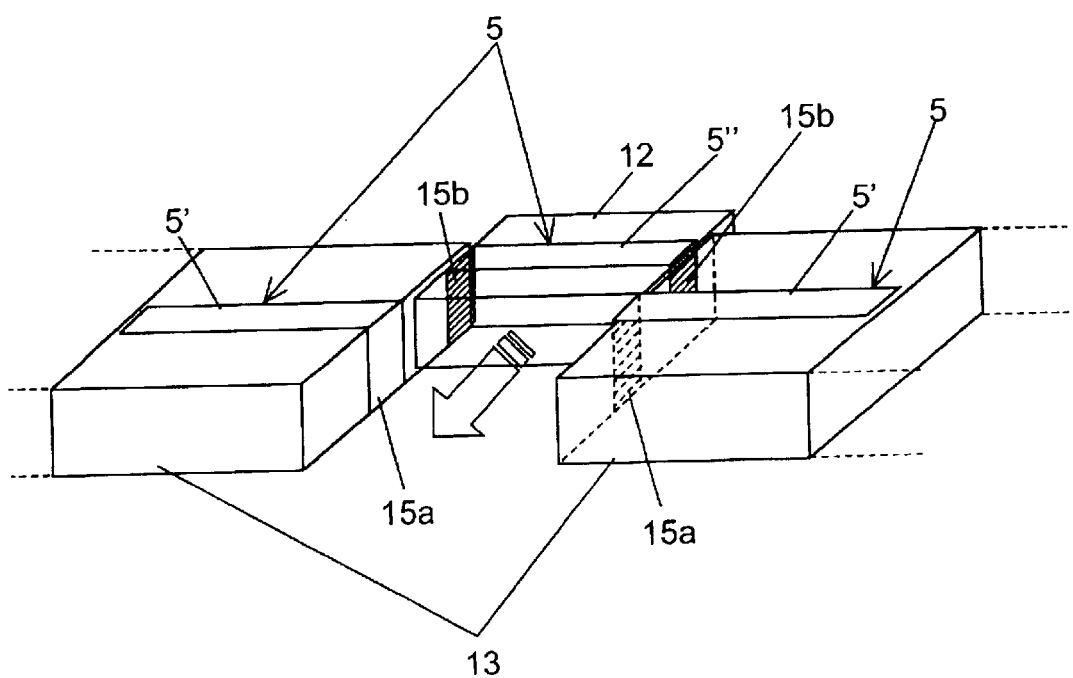
FIG. 12 is a perspective view of an essential part of the changeover switch in accordance with the fifth embodiment.

FIG. 12 is a perspective view of an essential part of changeover switch 12 in accordance with the fifth embodiment.

In FIG. 12, fixed conductor 5' and movable conductor 5" have metallic conductor terminals 15a, 15b at their respective contact parts. Fixed conductor 5' and movable conductor 5" are connected to each other by physical contact between conductor terminal 15a of fixed conductor 5' and conductor terminal 15b of movable conductor 5", thereby forming loop antenna 5.

Figure 13:
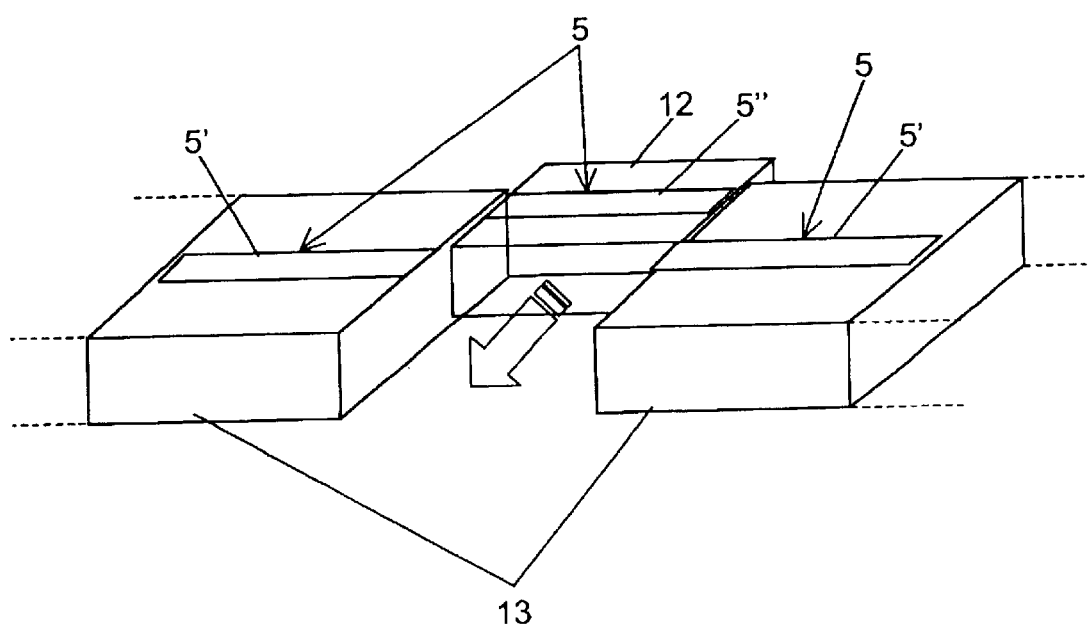
FIG. 13 is a perspective view of an essential part of another changeover switch in accordance with the fifth embodiment.

FIG. 13 is a perspective view of an essential part of another changeover switch 12 in accordance with the present embodiment.

In FIG. 13, fixed conductor 5' and movable conductor 5" can be inductively (electromagnetically) coupled to each other in non-contact relation. The inductive coupling between fixed and movable conductors 5', 5" causes these fixed and movable conductors 5', 5" to couple to each other at a high frequency, whereby loop antenna 5 is formed.

In FIGS. 10A and 10B, when changeover switch 12 is moved so as to insert movable conductor 5" in the gap of fixed conductor 5' of loop antenna 5 (this state is hereinafter referred to as "ON state"), movable conductor 5" connects both ends of fixed conductor 5' in the gap, whereby the loop coil of loop antenna 5 forms a perfect loop, enabling the transmission and reception of a radio wave.

When changeover switch 12 is moved so as to remove movable conductor 5" from the gap of fixed conductor 5', the ends of fixed conductor 5' of loop antenna 5 are disconnected from each other due to the presence of the gap (this state is hereinafter referred to as "OFF state"). Since the ends of fixed conductor 5' are not coupled to each other at the gap, the loop coil does not form a perfect loop and hence cannot transmit and receive the radio wave. Non-contact IC card 3 thus cannot transmit and receive the radio wave even when a question is sent from reader/writer 1. In other words, IC card 3 becomes able to refuse to reply to reader/writer 1, whereby personal information stored in this IC card 3 can be protected.

To reject the external device's reading of the personal information retained in non-contact IC card 3 on the basis of intended use, changeover switch 12 is brought to the "OFF state", as described above, to disconnect loop antenna 5, whereby the supply of electric power to IC chip 4 can be cut off. In this way, non-contact IC card 3 of the fifth embodiment can reject reading of its retained personal information from IC card 3.

(Exemplary Embodiment 6)

Figure 11A:
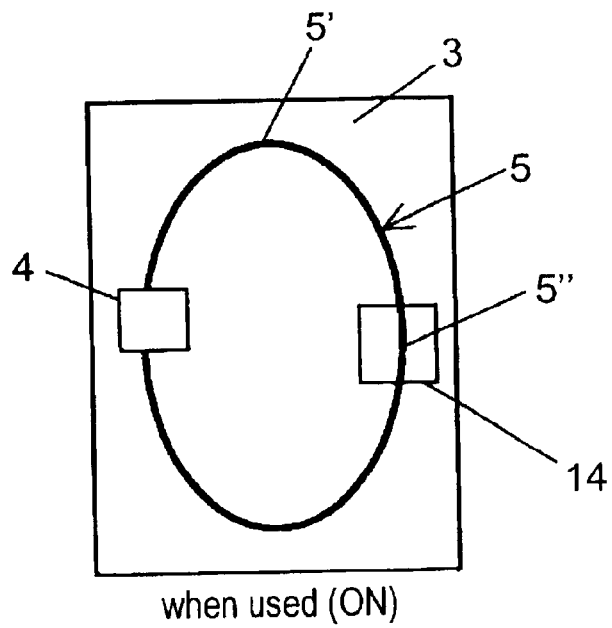
FIGS. 11A and 11B are schematic plan views illustrating a loop antenna and a changeover chip of a non-contact IC card in accordance with a sixth exemplary embodiment.
Figure 11B:
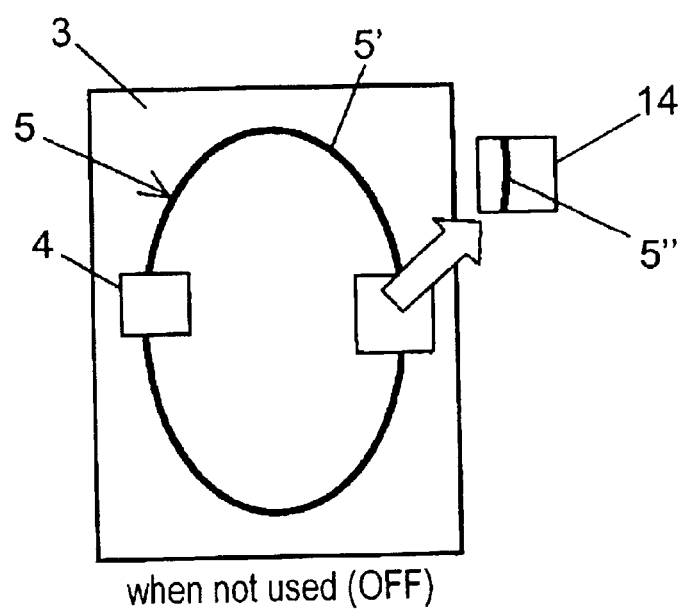

FIGS. 11A and 11B are schematic plan views illustrating a loop antenna and a changeover chip of a non-contact IC card in accordance with the sixth exemplary embodiment. The non-contact IC card of the present embodiment is similar in structure to that illustrated by FIG. 2.

In FIGS. 11A and 11B, non-contact IC card 3, IC chip 4 and loop antenna 5 are similar to those in FIGS. 10A and 10B, so that they have the same reference marks, and the descriptions of these elements are omitted.

In the present embodiment, a loop coil of loop antenna 5 is constructed of fixed conductor 5', which is fixed to a body of non-contact IC card 3 and shaped to have a gap at a loop part, and movable conductor 5" removable from the gap of fixed conductor 5'.

Loop antenna 5 is formed into a circular loop, an elliptical loop, a deformed circular loop or a deformed elliptical loop. IC chip 4 is disposed at a feeding point of loop antenna 5, and the gap of antenna 5 is positioned opposite to the feeding point.

Changeover chip 14 switches loop antenna 5 between a state in which transmission and reception are possible and a state in which the transmission and reception are impossible.

Movable conductor 5" is fixed to changeover chip 14 and can be inserted and removed in and from the gap of fixed conductor 5' by inserting and removing chip 14.

Figure 14:
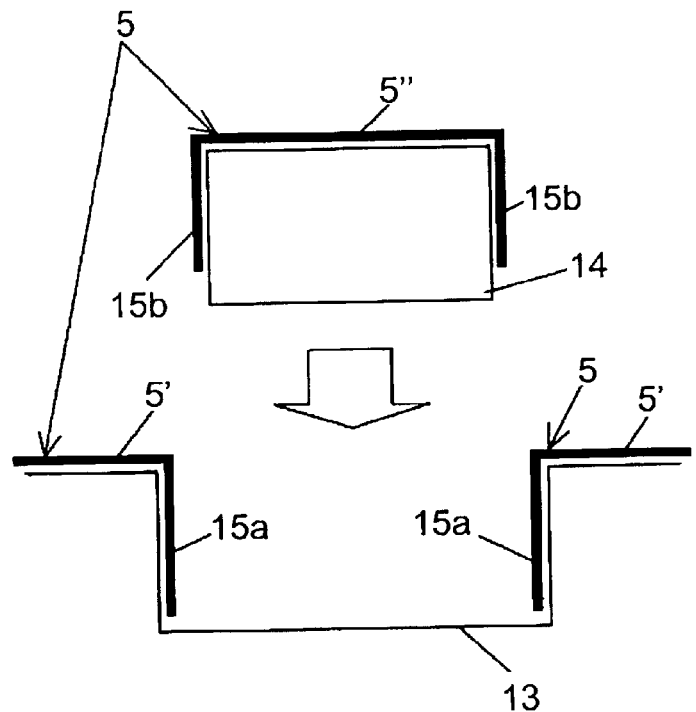
FIG. 14 is a sectional view of an essential part of the changeover chip in accordance with the sixth embodiment.

FIG. 14 is a sectional view of an essential part of changeover chip 14 in accordance with the sixth embodiment.

In FIG. 14, fixed conductor 5' and movable conductor 5" have metallic conductor terminals 15a, 15b at their respective contact parts. Fixed and movable conductors 5', 5" are connected to each other by physical contact between conductor terminal 15a of fixed conductor 5' and conductor terminal 15b of movable conductor 5", thereby forming loop antenna 5.

Figure 15:
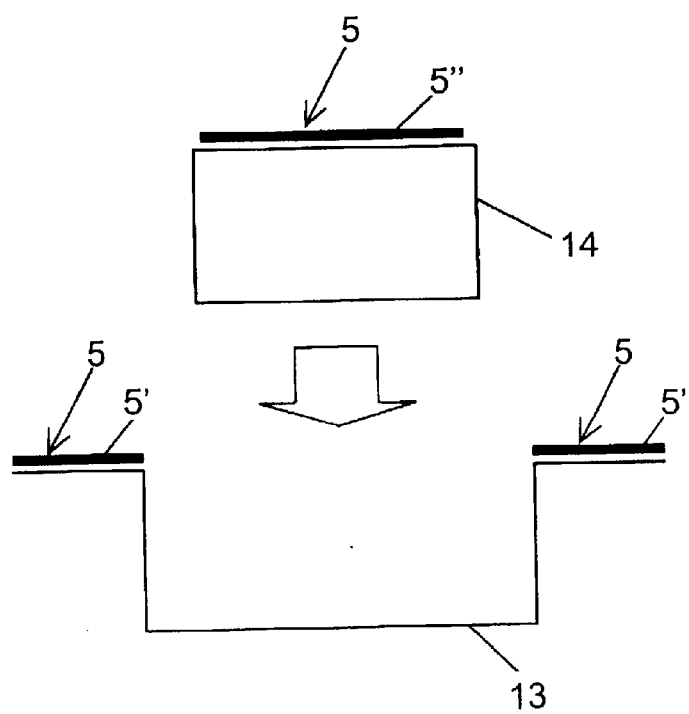
FIG. 15 is a sectional view of an essential part of another changeover chip in accordance with the sixth embodiment.

FIG. 15 is a sectional view of an essential part of another changeover chip 14 in accordance with the present embodiment.

In FIG. 15, fixed conductor 5' and movable conductor 5" can be inductively (electromagnetically) coupled to each other in non-contact relation. The inductive coupling between fixed and movable conductors 5', 5" causes these conductors 5', 5" to couple to each other at a high frequency, whereby loop antenna 5 is formed.

In FIGS. 11A and 11B, when changeover chip 14 is inserted in the gap of fixed conductor 5' thereby to insert movable conductor 5" in the gap of fixed conductor 5' of loop antenna 5 (this state is hereinafter referred to as "ON state"), movable conductor 5" connects both ends of fixed conductor 5' in the gap, whereby the loop coil of loop antenna 5 forms a perfect loop, enabling the transmission and reception of a radio wave.

When changeover chip 14 is detached thereby to remove movable conductor 5" from the gap of fixed conductor 5', the ends of fixed conductor 5' of loop antenna 5 are disconnected from each other due to the presence of the gap (this state is hereinafter referred to as "OFF state"). Since the ends of fixed conductor 5' are not coupled to each other at the gap, the loop coil does not form a perfect loop and hence cannot transmit and receive the radio wave. Non-contact IC card 3 thus cannot transmit and receive the radio wave even when a question is sent from reader/writer 1. In other words, IC card 3 becomes able to refuse to reply to reader/writer 1, whereby personal information stored in this IC card 3 can be protected.

To reject the external device's reading of the personal information retained in non-contact IC card 3 on the basis of intended use, changeover chip 14 is detached to switch to the "OFF state", as described above, for disconnection of loop antenna 5, whereby the supply of electric power to IC chip 4 can be cut off. In this way, non-contact IC card 3 of the sixth embodiment can reject reading of its retained personal information from IC card 3.

(Exemplary Embodiment 7)

Figure 16A:
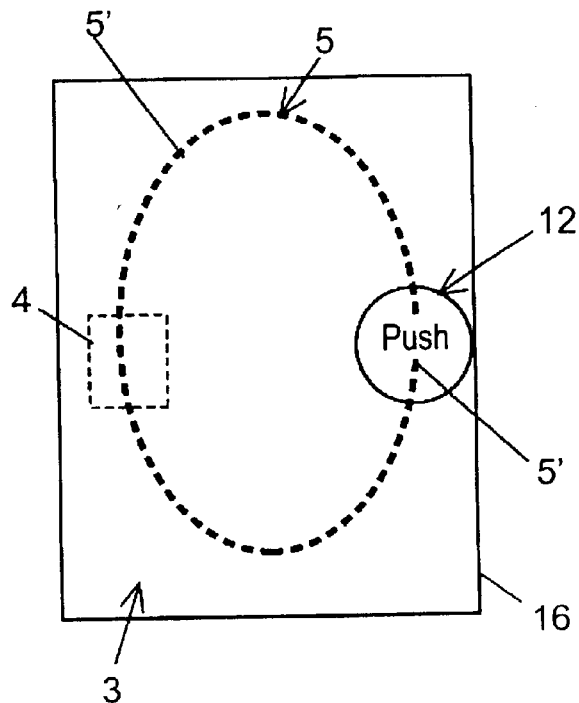
FIG. 16A is a schematic plan view of a non-contact IC card in accordance with a seventh exemplary embodiment.

FIG. 16A is a schematic plan view of a non-contact IC card in accordance with the seventh exemplary embodiment. The non-contact IC card of the present embodiment is similar in structure to that illustrated by FIG. 2.

In FIG. 16A, non-contact IC card 3, IC chip 4 and loop antenna 5 are similar to those in FIG. 2, so that they have the same reference marks, and the descriptions of these elements are omitted.

In the present embodiment, a loop coil of loop antenna 5 is constructed of fixed conductor 5', which is fixed to body 16 of non-contact IC card 3 and shaped to have a gap at a loop part, and movable conductor 5" removable from the gap of fixed conductor 5'.

Loop antenna 5 is formed into a circular loop, an elliptical loop, a deformed circular loop or a deformed elliptical loop. IC chip 4 is disposed at a feeding point of loop antenna 5, and the gap of antenna 5 is positioned opposite to the feeding point.

Changeover switch 12 switches loop antenna 5 between a state in which transmission and reception are possible and a state in which the transmission and reception are impossible. Changeover switch 12 of this embodiment is a push switch.

Figure 16B:
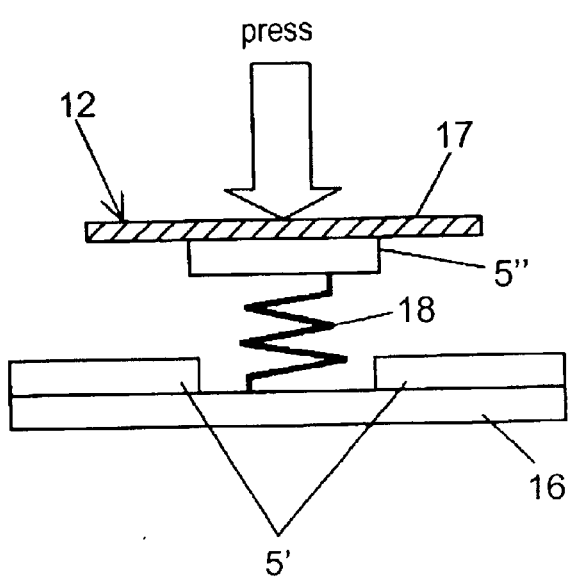
FIG. 16B is a schematic sectional view of a part including a changeover switch of the non-contact IC card in accordance with the seventh embodiment.
Figure 17:
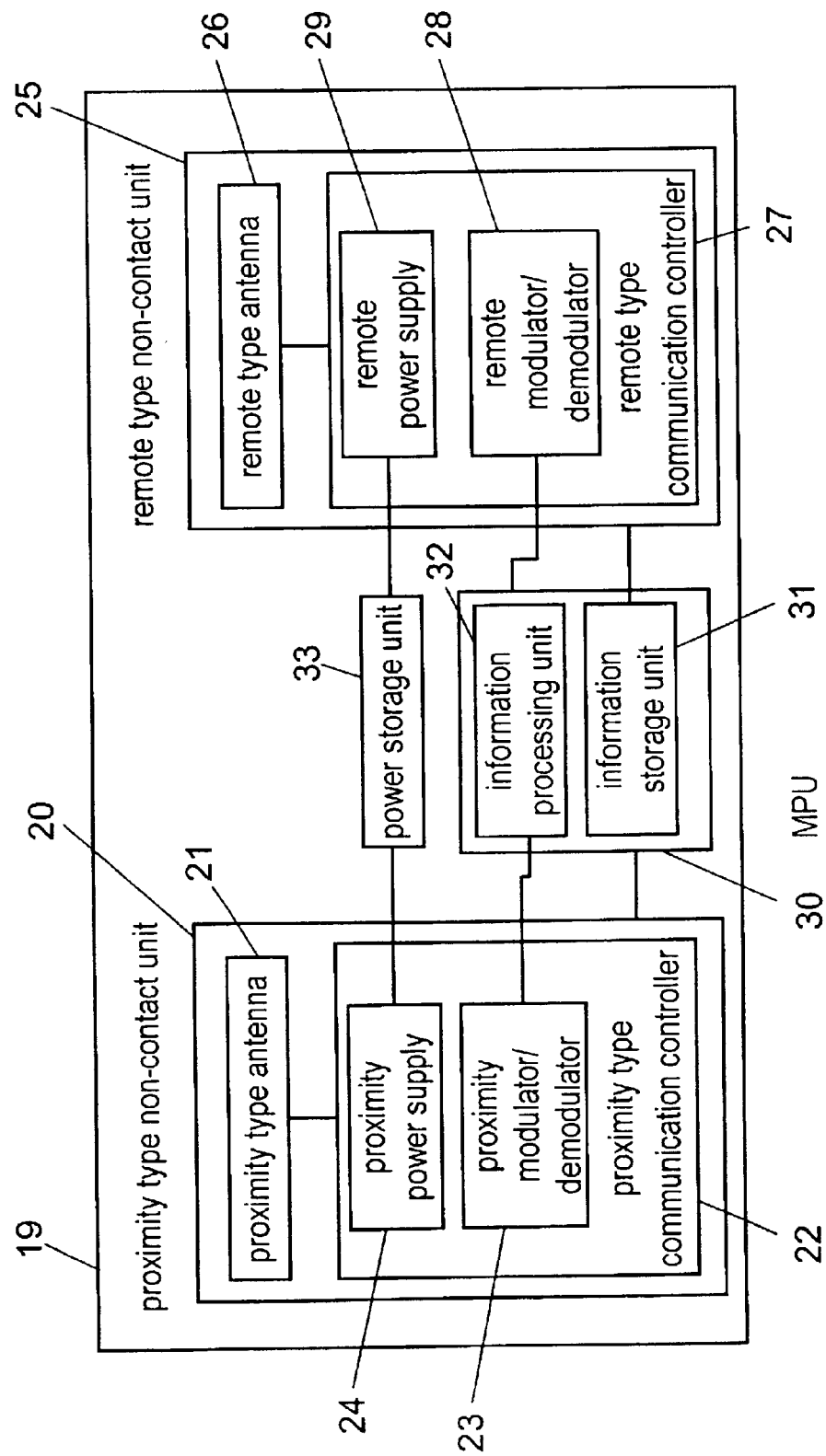
FIG. 17 is a block diagram of a conventional non-contact IC card.

FIG. 16B is a schematic sectional view of a part including the changeover switch of the non-contact IC card of the present embodiment.

In FIG. 16B, fixed conductor 5', movable conductor 5" and body 16 of non-contact IC card 3 are similar to those in FIG. 16A.

Push part 17 of changeover switch 12 is removable from the gap of fixed conductor 5', and spring 18 energizes push part 17 in a direction that removes push part 17 from the gap of fixed conductor 5'.

Movable conductor 5" is fixed to a bottom side of push part 17. Spring 18 is disposed between a bottom side of movable conductor 5" and body 16, whereby push part 17 and movable conductor 5" are energized in the direction that detaches push part 17 and movable conductor 5" from body 16.

In FIGS. 16A and 16B, when a user presses push part 17 of changeover switch 12 against body 16, movable conductor 5" fixed to switch 12 connects with fixed conductor 5', whereby the loop coil of loop antenna 5 forms a perfect loop, and consequently, loop antenna 5 becomes capable of transmission and reception.

When push part 17 of changeover switch 12 is released from body 16, movable conductor 5" is removed from the gap of fixed conductor 5' by resilience of spring 18, whereby the loop coil of loop antenna 5 is disconnected. This prevents loop antenna 5 from receiving a radio wave carrying electric power and a signal from reader/writer 1 and thus prevents others from stealing information stored in non-contact IC card 3 without bringing the user to the realization.

The fifth through seventh embodiments each have referred to circular loop antenna 5. However, antenna 5 may be square.

As described above, the non-contact IC card of the present invention allows the user to select the communication distance with ease according to service the user utilizes by switching the changeover switch.

Moreover, the non-contact IC card allows its user to refuse to transmit the information retained in the IC card in response to a question from the reader/writer for prevention of unsolicited disclosure of the information stored in the IC card.

The non-contact IC card of the present invention includes the information storage unit for storing the information, the communication controller for controlling the communication with the external device and the loop antenna for transmitting and receiving the radio wave to and from the external device. This non-contact IC card further includes a cut-off unit for forcibly cutting off the communication with the external device, and prevents leakage of the data retained by the non-contact IC card according to intended use by forcibly cutting off the communication with the external device by means of the cut-off unit.

Here, the slide switch, the push switch, the detachable changeover chip or the like is employed as the cut-off unit.

In cases where the cut-off unit is the changeover switch which switches the loop antenna between the state in which the transmission and reception are possible and the state in which the transmission and reception are impossible, the changeover switch brings the loop antenna to the state in which the antenna cannot transmit and receive, so that the question or a request from the reader/writer can be rejected with ease according to intended use. Thus, leakage of the data retained by the non-contact IC card is prevented.

In cases where the cut-off unit is the changeover chip detachable from the loop antenna, the loop antenna becomes usable when the changeover chip is mounted to the loop antenna, and the loop antenna becomes impossible to use when the changeover chip is detached from the loop antenna. By detaching the changeover chip according to intended use, transmission of the retained data in response to the question from the reader/writer can be refused. In this way, leakage of the data retained by the non-contact IC card is prevented.

What is claimed is:

1. A non-contact IC card comprising:
   an information storage unit for storing information;
   a communication controller for controlling communication with an external device;
   a loop antenna including a plurality of loop coils having different loop areas for transmitting and receiving a radio wave to and from the external device; and
   a changeover switch for changing a communication distance between n the external device and the card by selecting one of said plurality of loop coils,
   wherein the loop coils of the loop antenna include respective fixed conductors, each of which is fixed to a body of the card and shaped to include a gap at a loop part, and a movable conductor which moves with the changeover switch and is removable from the gap of the fixed conductor, and when the changeover switch is inserted in the gap of the fixed conductor of one of the loop coils, the movable conductor is coupled to the corresponding fixed conductor.

2. The non-contact IC card of claim 1, wherein the fixed conductor includes a conductor terminal at a part thereof which connects with the movable conductor, the movable conductor includes a conductor terminal at a part thereof which connects with the fixed conductor, and the conductor terminal of the movable conductor contacts the conductor terminal of the fixed conductor when the movable conductor is inserted in the gap of the fixed conductor.

3. The non-contact IC card of claim 1, wherein the movable conductor is inductively coupled to the fixed conductor without contacting the fixed conductor when the movable conductor is inserted in the gap of the fixed conductor.

4. A non-contact IC card according to claim 1, wherein said different loop areas provide respectively different antenna gain.

5. A non-contact IC card comprising;
   an information storage unit for storing information;
   a communication controller for controlling communication with an external device;
   a loop antenna including a plurality of loop coils having different loop areas for transmitting and receiving a radio wave to and from the external device; and
   a cut-off unit for forcibly cutting off the communication with the external device,
   wherein the cut-off unit includes a changeover switch for switch the loop antenna between a state in which transmission and reception are possible and a state in which the transmission and reception are impossible, and
   the loop antenna includes a loop coil, the loop coil includes a fixed conductor, which is fixed to a body of the card and shaped to include a gap at a loop part, and a movable conductor which moves with the changeover switch and is removable from the gap of the fixed conductor, and the movable conductor is coupled to the fixed conductor when the movable conductor of the changeover switch is inserted in the gap of the fixed conductor.

6. The non-contact IC card of claim 5, wherein the changeover switch includes a push part removable from the gap of the fixed conductor, and a spring for energizing the push part in a direction that removes the push part from the gap or the fixed conductor, and the movable conductor moves with the push part.

7. The non-contact IC card of claim 5, wherein the fixed conductor includes a conductor terminal at a part thereof which connects with the movable conductor, the movable conductor includes a conductor terminal at a part thereof which connects with the fixed conductor, and the conductor terminal of the movable conductor contacts the conductor terminal, of the fixed conductor when the movable conductor is inserted in the gap of the fixed conductor.

8. The non-contact IC card of claim 5, wherein the movable conductor is inductively coupled to the fixed conductor without contacting the fixed conductor when the movable conductor is inserted in the gap of the fixed conductor.

9. The non-contact IC card of claim 5, wherein the cut-off unit includes a changeover chip detachable from the loop antenna, the loop antenna becomes usable when the changeover chip is mounted to the loop antenna, and the loop antenna becomes impossible to use when the changeover chip is detached from the loop antenna.

10. The non-contact IC card of claim 9, wherein the loop antenna includes a loop coil, the loop coil includes a fixed conductor, which is fixed to a body of the card and shaped to include a gap at a loop part, and a movable conductor which is fixed to the changeover chip and removable from the gap of the fixed conductor, a the movable conductor is coupled to the fixed conductor when the changeover chip is placed in the gap of the fixed conductor of the loop antenna.

11. The non-contact IC card of claim 10, wherein the fixed conductor includes a conductor terminal at a part thereof which connects with the movable conductor, the movable conductor includes a conductor terminal at a part thereof which connects with the fixed conductor, and the conductor terminal of the movable conductor contacts the conductor terminal of the fixed conductor when the movable conductor is inserted in the gap of the fixed conductor.

12. The non-contact IC card of claim 10, wherein the movable conductor is inductively coupled to the fixed conductor without contacting the fixed conductor when the movable conductor is inserted in the gap of the fixed conductor.

13. A non-contact IC card according to claim 5, wherein said different loop areas provide respectively different antenna gain.

14. A non-contact IC card according to claim 13, wherein said cut-off unit is also for selecting one of said plurality of loop coils.

* * * * *